(12) United States Patent
Berry et al.

(10) Patent No.: US 8,043,704 B2
(45) Date of Patent: Oct. 25, 2011

(54) LAYERED, TRANSPARENT THERMOPLASTIC FOR FLAMMABILITY RESISTANCE

(75) Inventors: Craig L. Berry, Sammamish, WA (US); Daniel W. Cushing, Covington, WA (US); Eugene A. Jackson, Renton, WA (US)

(73) Assignee: The Boeing Company, Chicago, IL (US)

( * ) Notice: Subject to any disclaimer, the term of this patent is extended or adjusted under 35 U.S.C. 154(b) by 924 days.

(21) Appl. No.: 11/102,401

(22) Filed: Apr. 8, 2005

(65) Prior Publication Data

US 2006/0228558 A1    Oct. 12, 2006

(51) Int. Cl.
*B32B 27/36* (2006.01)

(52) U.S. Cl. ............... 428/412; 428/411.1; 244/117 R; 244/133

(58) Field of Classification Search ............ 428/411.1, 428/412

See application file for complete search history.

(56) References Cited

U.S. PATENT DOCUMENTS

| | | | |
|---|---|---|---|
| 3,810,815 A | 5/1974 | Welhart et al. | |
| 3,928,708 A | 12/1975 | Fohlen et al. | |
| 4,081,581 A | 3/1978 | Littell, Jr. et al. | |
| 5,098,778 A | 3/1992 | Minnick | |
| 5,300,858 A * | 4/1994 | Nikaido | 313/503 |
| 5,304,413 A * | 4/1994 | Bloom et al. | 428/215 |
| 6,092,915 A * | 7/2000 | Rensch | 362/471 |
| 6,218,017 B1 * | 4/2001 | Yamashita et al. | 428/424.2 |
| 6,251,506 B1 * | 6/2001 | Davis et al. | 428/213 |
| 2001/0018476 A1 | 8/2001 | Murschall et al. | |
| 2002/0086174 A1 * | 7/2002 | Genske et al. | 428/516 |
| 2003/0082339 A1 * | 5/2003 | Bernetich | 428/116 |
| 2004/0072929 A1 | 4/2004 | De Schryver | |
| 2005/0020803 A1 * | 1/2005 | Machida et al. | |

FOREIGN PATENT DOCUMENTS

| | | |
|---|---|---|
| DE | 3716004 A1 | 11/1988 |
| EP | 0 453 784 A3 | 10/1991 |
| JP | 60067128 * | 4/1985 |

* cited by examiner

*Primary Examiner* — James J Seidleck
*Assistant Examiner* — Saira B Haider
(74) *Attorney, Agent, or Firm* — Ostrager Chong Flaherty & Broitman P.C.

(57) ABSTRACT

A layered material for use in transparent, flame resistant components couples a thin, fire resistant outer polymeric film to a thicker, transparent inner polymeric material. The resultant transparent layered material meets FAA flammability requirements for OSU heat release, has excellent solvent resistance and cleanability, is scratch resistant, and is transparent enough for use in interior applications in the aerospace industry. The layered material is formed via a co-extrusion or co-lamination process.

5 Claims, 3 Drawing Sheets

ID, TRANSPARENT
THERMOPLASTIC FOR FLAMMABILITY
RESISTANCE

CROSS-REFERENCE TO RELATED APPLICATIONS

U.S. patent application Ser. No. 10/707,612, filed Dec. 24, 2003 is a related application.

TECHNICAL FIELD

The present invention generally relates to layered materials and more specifically to layered, transparent thermoplastic materials having flame resistant properties.

BACKGROUND ART

The interiors of commercial aircraft are typically formed with a large number of components in many shapes and forms that have both practical and aesthetic functions. Currently, the aerospace and plastics industry does not have available any clear transparent materials that will pass current Federal Aviation Administration (FAA) requirements in terms of flammability resistance properties (FAR 25.853 and Appendix F), including heat release, vertical burn, smoke emissions tests, and toxic fume emissions tests. For example, the standard test method for heat release is the Ohio State University heat release test as found in FAR 25.853-Part IV.

Transparent windows used today on commercial aircraft are typically formed of a transparent polycarbonate material having a scratch-resistant polysiloxane coating. Because these polycarbonate windows do not meet the FAA requirements for OSU heat release, exemptions have been provided by the FAA to allow their use. For airplane windows, however, the FAA exemption has limited the size of the windows so as not to impose more than the historic vertical burn flammability requirement.

It is highly desirable to increase the size of these interior windows for aesthetic purposes. In order to increase the size of the windows further, while maintaining the transparency and scratch resistance properties desired, however, it is necessary to comply with the FAA requirements for OSU heat release.

SUMMARY OF THE INVENTION

The present invention provides a layered material is formed by having a thin, flammable and heat resistant outer polymeric material coupled to the exterior of a thicker, transparent polymeric inner material. The total thickness of the layered material is between about between about 0.03 and 0.20 inches, more preferably between about 0.04 and 0.12 inches, and most preferably approximately 0.10 inches. The layered material meets the current Federal Aviation Administration ("FAA") requirements in terms of flammability resistance properties (FAR 25.853 and Appendix F), including heat release, vertical burn, smoke emissions tests, and toxic fume emissions tests. The layered material also passes the Ohio State University ("OSU") heat release test as found in FAR 25.853-Part IV. The layered material is also durable and scratch resistant and has the desired mechanical properties in terms of strength and flex modulus. The layered material is also transparent at thicknesses useful for a wide variety of application. One such application is in the cabin interior of commercial aircraft, including, preferably, for use as a transparent dust cover for commercial airplane windows. Other applications for the layered material within the cabin interior of commercial aircraft include, but are not limited to, use on back-lit signs or other lighting possibilities, class dividers, bins which do not restrict the view of flight attendants and other safety features such as instrument panels.

The polymeric inner material is one having the desired transparency and mechanical properties at the desired thickness but alone does not meet the current FAA flammability resistance properties or pass the OSU heat release test. The polymeric outer material meets the FAA flammability and OSU heat resistant requirements, but does not possess the requisite transparency at the desired thickness (over about 5 mils).

The present invention also provides two preferred methods for forming the layered material. In the co-lamination method, preformed films of a polymeric outer material are laminated to a preformed inner polymeric material under heat and pressure and subsequently cooled under controlled conditions to form the layered material. Alternatively, via a co-extrusion process, the polymeric inner material is extruded between preformed film layers of the polymeric outer material and cooled under controlled conditions to form the layered material.

Other objects and advantages of the present invention will become apparent upon considering the following detailed description and appended claims, and upon reference to the accompanying drawings.

BEST MODES FOR CARRYING OUT THE INVENTION

The present invention discloses a layered material that meets the current Federal Aviation Administration ("FAA") requirements in terms of flammability resistance properties (FAR 25.853 and Appendix F), including heat release, vertical burn, smoke emissions tests, and toxic fume emissions tests. The layered material also passes the Ohio State University ("OSU") heat release test as found in FAR 25.853-Part IV. The layered material is also durable and scratch resistant and has a thickness between about between about 0.03 and 0.20 inches, more preferably between about 0.04 and 0.12 inches, and most preferably approximately 0.10 inches. The layered material, in the range of thicknesses above, achieves sufficient transparency and mechanical properties for use in a wide variety of potential applications, including, for example, as a dust cover used in a commercial aircraft window assembly.

Figure 1:
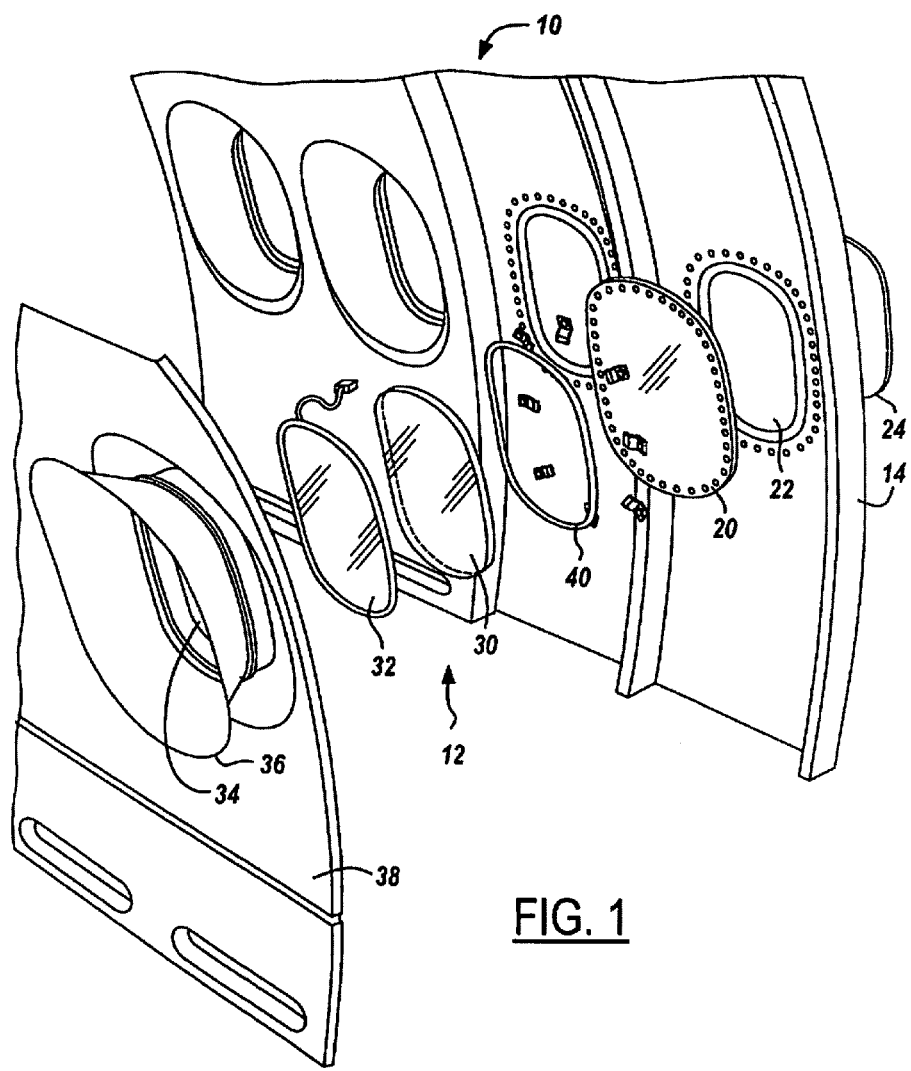
FIG. 1 illustrates a aircraft window assembly formed in accordance with a preferred embodiment of the present invention.

Referring now to FIG. 1, an aircraft window assembly 10 is shown having a multi-piece window assembly 12 that is sealed between and within the outer structure 14 of the fuselage 16 and an inner cabin liner 38.

The multi-piece window assembly 12 includes a structural window 20 fixedly coupled around an opening 22 in the outer structure 14 using a plurality of screws or rivets 28. The window assembly 12 also includes a fail-safe pane 30 and an electronic shade with dust cover 32. The multi-piece window assembly 12 is sealed around an opening 34 in an inner fairing 36 of the inner cabin liner 38 and the structural window 20 using a seal 40.

The dust cover 32 passes current Federal Aviation Administration (FAA) requirements in terms of flammability resistance properties (FAR 25.853 and Appendix F), including heat release, vertical burn, smoke emissions tests, and toxic fume emissions tests. The dust cover 32 also passes the Ohio State University heat release test as found in FAR 25.853-Part IV. The dust cover 32 is also sufficiently transparent and has acceptable color, and possesses the necessary physical and mechanical properties for use in commercial aircraft, including but not limited to meeting or exceeding below for ultimate tensile strength and modulus, flexural strength and modulus, durability (in terms of ultraviolet light exposure and weather exposure (as described in the Experimental Section), specific gravity and density and impact and scratch resistance at the desired thickness (between about 0.03 and 0.20 inches, more preferably between about 0.04 and 0.12 inches, and most preferably approximately 0.10 inches). The physical, mechanical and flammability requirements of the dust cover 32 is summarized below in Table 1:

TABLE 1

Physical, Mechanical And Flammability Property Requirements

| TEST DESCRIPTION | REQUIREMENT | TEST METHOD |
|---|---|---|
| Flammability—(Performed on a 3 inch nominal by 12 inch nominal by 0.060 +/− 0.005 inch thick panel) | | (BSS 7230) |
| 60-second Vertical | | (Method F1) |
| Extinguishing Time | 15 seconds, max. | |
| Burn Length | 6 inches, max. | |
| Drip Extinguishing Time | 3 seconds, max. | |
| 12-second Vertical | | (Method F2) |
| Extinguishing Time | 15 seconds, max. | |
| Burn Length | 8 inches, max. | |
| Drip Extinguishing Time | 5 seconds, max. | |
| Impact Resistance | | (BSS 7271) |
| Thickness less than 0.08 inch | 50 in-lbs, min. | |
| Thickness 0.08 inch or greater | 100 in-lbs, min. | |
| Melt Flow Index | | ASTM D 1238 (Condition 300/1.2) |
| Color and Appearance | | D6-36000 |
| Glass Transition Temperature | | ASTM D 3418 |
| Manufacturing Defects | Free of voids, blisters and foreign particles | Visual Inspection |
| Haze and Luminous Transmittance | | ASTM D 1003 |
| Haze | 5 percent, max. | |
| Luminous Transmittance | 85 percent, min. | |
| Specific Gravity | 1.20 to 1.28 | ASTM D 792 |
| Tensile Strength and Modulus of Elasticity (Minimum 5 samples tested at cross-head speed of 0.20 +/− 0.05 inch per minute) | | ASTM D 638 |
| Tensile Strength - Ultimate | 8.0 ksi, min. | |
| Modulus | 250 ksi, min. | |
| Flexural Strength and | | ASTM D 790 - |

TABLE 1-continued

Physical, Mechanical And Flammability Property Requirements

| TEST DESCRIPTION | REQUIREMENT | TEST METHOD |
|---|---|---|
| Flexural Modulus (using span to thickness ratio between 16 to 1 and 20 to 1 and cross-head speed of 0.05 inch per minute, minimum of 5 specimens tested and averaged) | | Method 1 |
| Flexural Strength | 12.0 ksi, min. | |
| Flexural Modulus | 300 ksi, min. | |
| Heat Deflection Temperature (at 264 psi) | 260 F., min. | ASTM D 648 using 264 psi fiber stress |
| NBS Smoke (test specimens 0.060 +/− 0.005 inch thick) | | BSS 7238, flaming method |
| Type I and II | 200 $D_s$ at 4 minutes, max. | |
| Type III and IV | 200 $D_s$ at 3 minutes, max. | |
| NBS Toxic Gas (test specimens 0.060 +/− 0.005 inch thick) | | BSS 7239, flaming method |
| CO, HCN, HF, HCL, $SO_2$, NO$x$ | 3500, 150, 200, 500, 100, 100 ppm, max. | |

Figure 2:
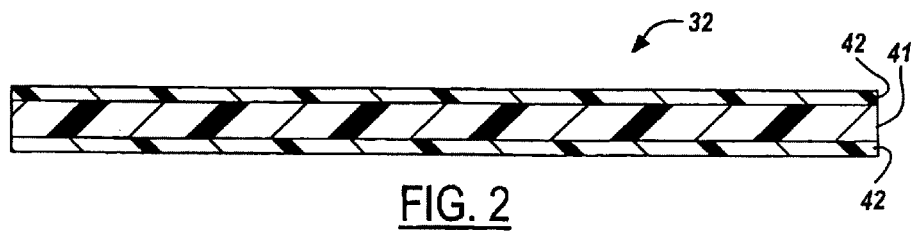
FIG. 2 is a section view of a portion of FIG. 1 taken along line 2-2.

As best shown in FIG. 2, the dust cover 32 is formed by first coupling a thin polymeric film 42 to at least one, and more preferably both sides of a thicker inner transparent polymeric material 41. The dust cover 32 is then sized and shaped and otherwise post-processed to fit within the openings 22, 34 created within the inner and outer fairings 24, 36 of the window assembly 10.

The inner transparent polymeric material 41 is one having the desired transparency and mechanical properties as described in Table 1 above at thickness between about 0.03 inches and 0.20 inches for use as a dust cover 32, but alone does not meet the current FAA flammability resistance properties or pass the OSU heat release test as described in the previous paragraphs.

The thin polymeric film 42 meets the FAA flammability and OSU heat resistant requirements and is sufficiently transparent as a thin film (less than about 5 mils), but does not possess the requisite transparency at thicknesses between 0.03 and 0.20 inches necessary for use as the dust cover 32.

The outer transparent polymeric film 42 therefore provides the necessary flammability resistance and heat release characteristics to protect the thicker inner material 41 while being thin enough not to adversely affect the transparency of the resultant dust cover 32. The outer transparent film 42 also provides solvent resistance, cleanability, durability, weatherability and a degree of scratch resistance to the formed layered dust cover 32.

One preferred polymeric material used as the inner transparent material 41 is clear, uncolored (or untinted) forms of polycarbonate. Preferred sufficiently transparent versions of the polycarbonate have a melt temperature between about 520 and 620 degrees Fahrenheit (270-330 degrees Celsius). Examples of specific commercially available polycarbonates that meet the requirements of Table 1 include Lexan ML 4249, Lexan 9600-116, Lexan ML 4506-116, Lexan ML 4248-116, Lexan ML 4249-116, and Lexan F 2104 all available from GE Plastics of Cobourg, Ontario Canada. Other clear, uncolored polycarbonates that may also be used are Hyzod F 15700 and Hyzod F 15400, both available from Sheffield Plastics of Sheffield, Mass.

Other materials that may be used as the inner transparent polymeric material 41 include polyethersulfone ("PES") and various acrylic polymers. Commercially available forms of these materials include polyethersulfones such as Radel® (available from Solvay Advanced Polymers, LLC of Alpharetta, Ga.), and acrylics such as Plexiglas® (available from AtoHaas North America of Philadelphia, Pa.).

One preferred material meeting the criteria for use as the outer polymeric film 42 is polyetherketoneketone (PEKK). PEKK provides the requisite FAA flammability requirements and further provides a scratch resistant outer surface, thereby removing the need to add a scratch resistant coating such as polysiloxane.

Other materials that meet the OSU requirements for heat release and have sufficient transparency include polyetheretherketone (PEEK), Parmax® SRP (a self reinforcing polymer based on homopolymers and copolymers based on a substituted poly(1,4-phenylene) structure where each phenylene ring has a substituent derived from a variety of organic groups and available from Mississippi Polymer Technologies, inc. of Bay St. Louis, Mississippi). The ultimate thickness of the film 41 is dependent upon a combination of the flame retardant and transparency properties of the particular polymer or copolymer within the desired thickness range (less than about 5 mils).

Figure 3:
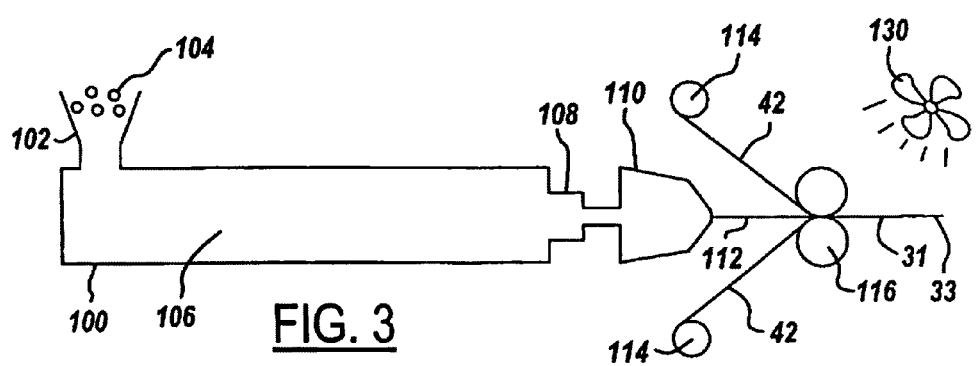
FIG. 3 is a schematic view of a extrusion assembly line used to make the layered material of FIG. 2.

Referring now to FIG. 3, the dust cover 32 is formed, in accordance with one preferred embodiment of the present invention, using a co-extrusion technique. In this technique, the material 104 forming the inner transparent material 41 is loaded into hopper 102 of a single- or multi-screw extruder 100. The material 104 is then mixed and melted within the barrel 106 of the extruder 100. For example, polycarbonates are melted in the extruder 100 between about 520 and 620 degrees Fahrenheit (between about 270 and 330 degrees Celsius). The mixed and melted material 104 exits the extruder 100 through a nozzle 108 and sheet-forming die 110 that are sized to form a sheet 112 at the desired thickness. The sheet 112 exits the die 110 slightly below its melt temperature.

A pair of outer transparent films 42 are unrolled from individual rollers 114 located above and below the sheet 112, respectively. The films 42 and sheet 112 are then moved along a conveyor (not shown) and introduced between a pair of heated polished rollers 116, which presses the films 42 into the extruded sheet 112 at a predetermined pressure. The rollers 116 are maintained at about 300 degrees Fahrenheit (about 150 degrees Celsius) and function to chill the inner hot sheet 112, therein allowing the lamination of the outer films 42 to a respective side of the sheet 112.

The heated laminated material 31 exits the rollers 116 along a second conveyor (not shown) and is cooled to form the layered material 33. The predetermined pressure exerted between the rollers 116 and cooling characteristics determines the overall thickness of the layered material 33. To minimize recrystallization of the polymer materials used in the films 42, cooling fans 130, located in close proximity to the heating rollers 116, direct airflow to cool the material 31 quickly. The cooling rate is controlled by the fans 130 to assure both bond strength between the outer film material 42 and the inner material 112 while minimizing the level of crystallites in the outer film 42 to achieve the necessary transparency. The exact process parameters will be determined as a function of processing equipment capabilities, the thermal properties of the materials being used, and the physical dimensions of the required sheets.

Figure 4:
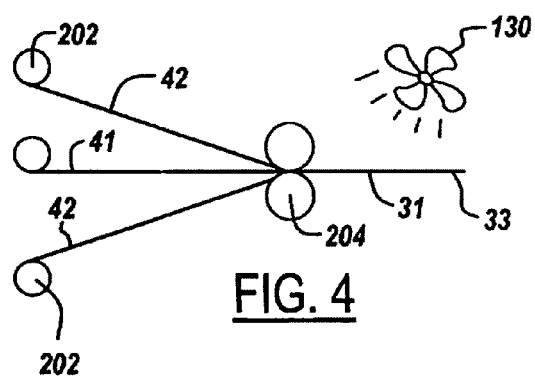
FIG. 4 is a schematic view of a lamination assembly line used to make the layered material of FIG. 2.

Referring now to FIG. 4, the dust cover 32 is formed, in accordance with another preferred embodiment of the present invention, using a co-lamination technique. In this technique, a pair of outer transparent films 42 are unrolled from rollers 202 above and below a preformed inner transparent material 41 and all are introduced between a pair of heated polished rollers 204. The pressure exerted by the heated rollers 204, along with the temperature of the rollers 204, soften the inner transparent film 41 sufficiently to allow the outer films 42 to be laminated onto the inner transparent material 41 to form a heated laminated material 31.

The heated laminated material 31 exits the rollers 116 and is cooled to form the layered material 33. The predetermined pressure exerted between the rollers 116 and cooling characteristics determines the overall thickness of the layered material 33. To minimize recrystallization of the polymer materials used in the films 42, cooling fans 130, located in close proximity to the heating rollers 116, direct airflow to cool the material 31 quickly. The cooling rate is controlled by the fans 130 to assure both bond strength between the outer film material 42 and the inner material 112 while minimizing the level of crystallites in the outer film 42 to achieve the necessary transparency. The exact process parameters will be determined as a function of processing equipment capabilities, the thermal properties of the materials being used, and the physical dimensions of the required sheets.

To form a dust cover 32, the layered material 33 formed in accordance with either preferred method is post processed in a manner well known in the aerospace industry concerning shaping windows. For the majority of the dust covers 32, the layered material 33 is machined or die stamped to the desired shape.

Figure 5:
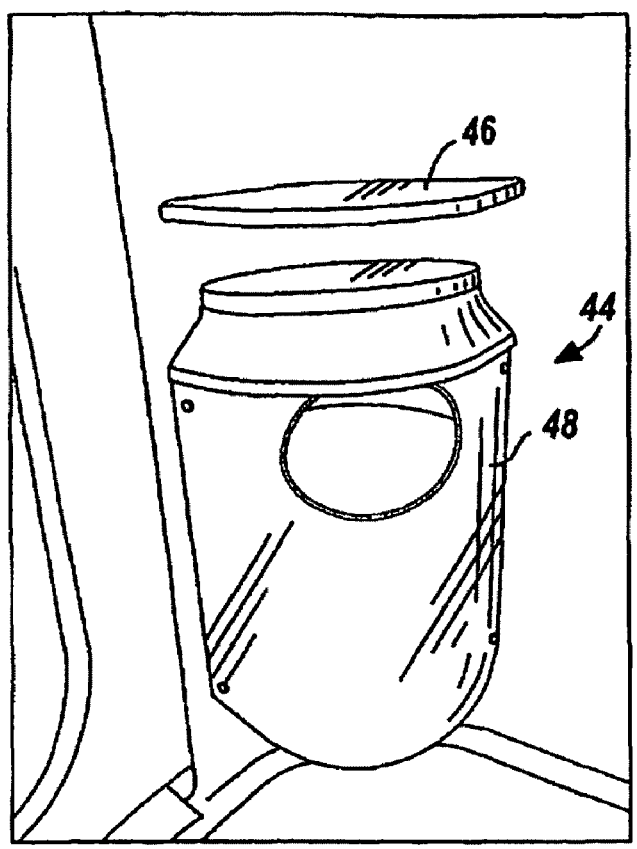
FIG. 5 is an interior view of an aircraft cabin having a plurality of components utilizing the layered material of FIG. 2.

While the layered material 33 is ideally suited for use as a transparent dust cover 32 for airplane windows, a similar layered material 33 (having a thin polymer film 42 coupled to one or more sides on the inner polymer material 41) may be formed and utilized for use on other components 44 within the cabin region of the airplane fuselage. For example, as shown in FIG. 5, non-limiting examples of components 44 that are formed from the layered material of the present invention include countertops 46, cabinet enclosures 48 such as wastebaskets, tray tables 50, backlit lighted signs 52 such as emergency exit signs 54, illuminating window panels 56 having light emitting diode displays 58, window bezels 60, class dividers 62, privacy partitions 64, backlit ceiling panels 66, direct lighting ceiling panels 68, lighted doors 70, lighted door latches 72, doorway linings 74, proximity lights 76, stow bin doors 78, privacy curtains 80, door handles 82 (capable of changing from red to green, for example), amenity cabinets 84, sink decks 86 for lavatories and kitchens (with or without an appropriate undersink enclosure 88), doorway liners 90, stow bin latch handles 92, lighted phones 94, and backlit control panels 96.

In addition, the layered material 33 may also find applications outside of the aerospace industry in components requiring similar mechanical and flammability properties. Thus, for example, the present invention may find uses in windows or various displays on automobiles.

To test the efficacy of the dust cover 32 for use in aerospace applications such as cabin interiors, test samples were prepared and evaluated for weatherability and durability. In one test, samples prepared using a polycarbonate inner material 42 coated on either side with a five mil thick PEKK coating 41 were subjected to a 17-day cycle of weatherability. This cycle, hereinafter referred to as the "GAG" cycle, varies the atmospheric conditions from between −65 and 170 degrees Fahrenheit (about −50 to 75 degrees Celsius) and simulates atmospheric conditions from sea level to the upper atmosphere. This test is designed to determine if the materials use in laminated layers will disbond due to dissimilar thermal expansion characteristics. The samples made in accordance with the preferred embodiments of the present invention, using either the coextrusion or colamination technique, showed no mechanical defects (delamination and durability) or transparency loss.

While the invention has been described in terms of preferred embodiments, it will be understood, of course, that the invention is not limited thereto since modifications may be made by those skilled in the art, particularly in light of the foregoing teachings.

What is claimed is:

1. A clear, layered thermoplastic material for use in transparent, flame-resistant components, the layered material consisting of:
   a relatively thick inner polymeric layer having a first and a second side, said inner polymeric material having excellent transparency but relatively poor heat release properties, said relatively thick inner polymeric layer being a polycarbonate material having a melt temperature between about 270 and 300 degrees Celsius; and
   a first thin, transparent outer polymeric layer in direct and intimate contact with a first side of said transparent inner polymeric layer, and a second thin transparent outer polymeric layer in direct and intimate contact with said second side of said transparent inner polymeric layer, said first and second outer polymeric layers being a film material selected from the group consisting of clear, uncolored polyetherketoneketone and polyetheretherketone, having relatively superior heat release and flame resistance properties, and having good transparency when used in film form, but relatively poor transparency properties when used in thicker sections;
   wherein the thickness of the first and second outer polymeric film layers does not exceed about 5 mils and wherein the combined thickness of the relatively thick inner polymer layer and the thin, transparent out polymeric film layers is between about 0.03 inches and 0.200 inches.

2. The layered material of claim 1, wherein said first and second outer polymeric film layers comprise a polyetherketoneketone film.

3. The layered material of claim 1, wherein said first and second outer polymeric film layers comprise a polyetheretherketone film.

4. A dust cover formed from the layered material of claim 1.

5. A clear, layered thermoplastic material for use in transparent, flame-resistant components, the layered material consisting of:
   a relatively thick inner performed polymeric layer of clear, uncolored polycarbonate material having a melt temperature between about 270 and 330 degrees Celsius, having excellent transparency but relatively poor heat release properties and having a first side and a second side;
   a first thin, transparent outer polymeric layer of clear, uncolored polyetherketoneketone film in direct and intimate contact with said first side of said transparent inner polymeric layer, said outer polymeric layer having relatively superior heat release and flame resistance properties, and having good transparency when used in film form, but relatively poor transparency properties when used in thicker sections; and
   a second thin, transparent layer of said outer polymeric layer in direct and intimate contact with said second side of said inner transparent polymeric layer such that said inner polymeric layer is contained between said first and said second outer polymeric layers to form a three layer laminate with excellent transparency and fire resistance;
   wherein the thickness of the layers of outer polymeric material does not exceed about 5 mils and wherein the combined thickness of the relatively thick inner polymer layer and the thin, transparent outer layers of polymeric material is between about 0.03 inches and 0.200 inches.

\* \* \* \* \*